July 24, 1962
J. M. ANDERSEN ETAL
3,046,033
NESTABLE SHOP TRUCK
Filed Sept. 25, 1959
6 Sheets-Sheet 1
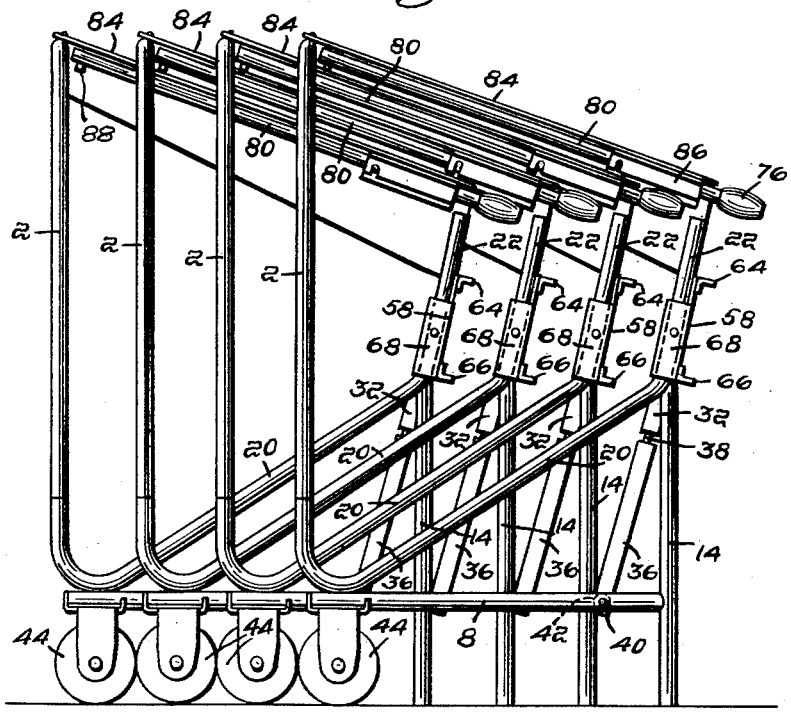
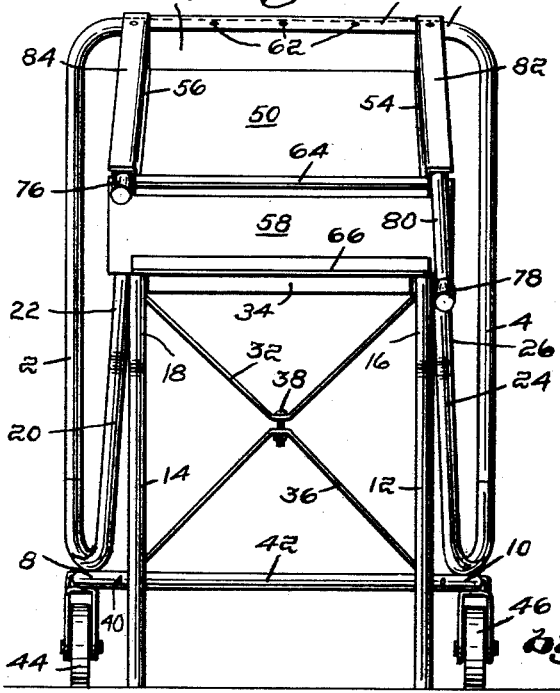
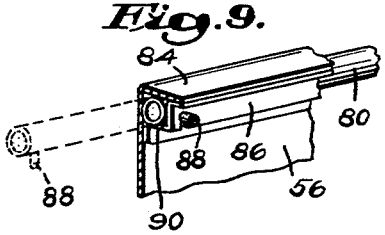
Inventors:
Johan M. Andersen
John H. Dockstader
by Porter, Chittick & Russell
Attorneys July 24, 1962  J. M. ANDERSEN ETAL  3,046,033
NESTABLE SHOP TRUCK
Filed Sept. 25, 1959  6 Sheets-Sheet 2
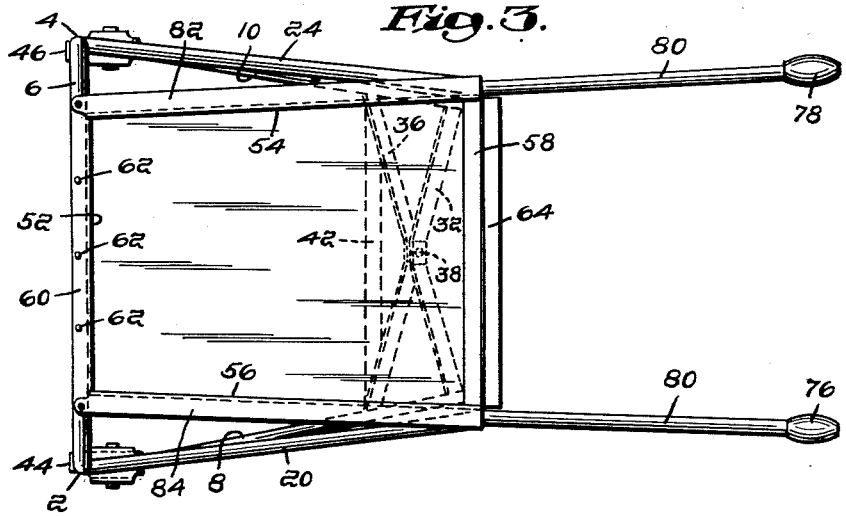
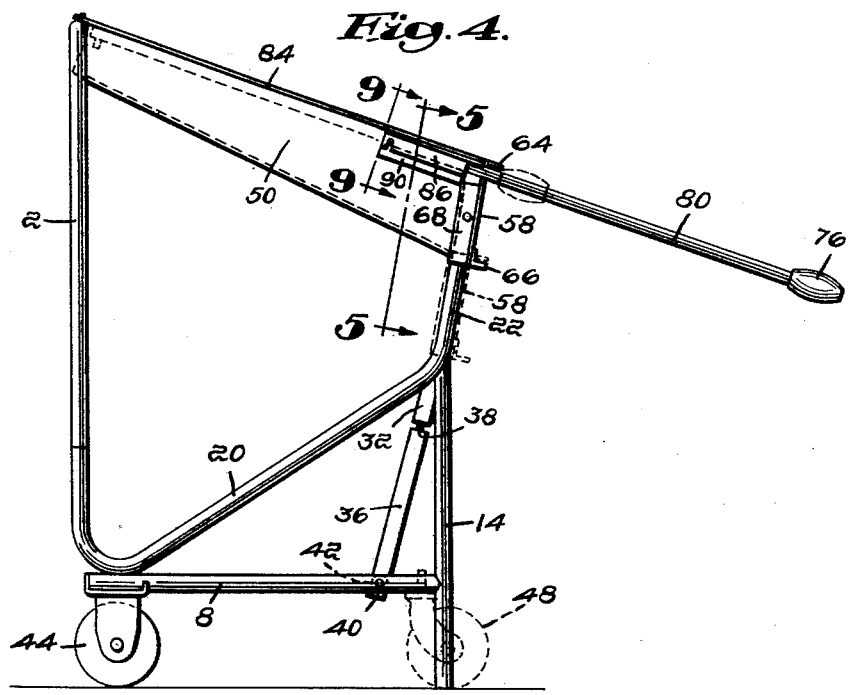
Inventors
Johan M. Andersen
John H. Dockstader
by Porter Chittick & Russell
Attorneys

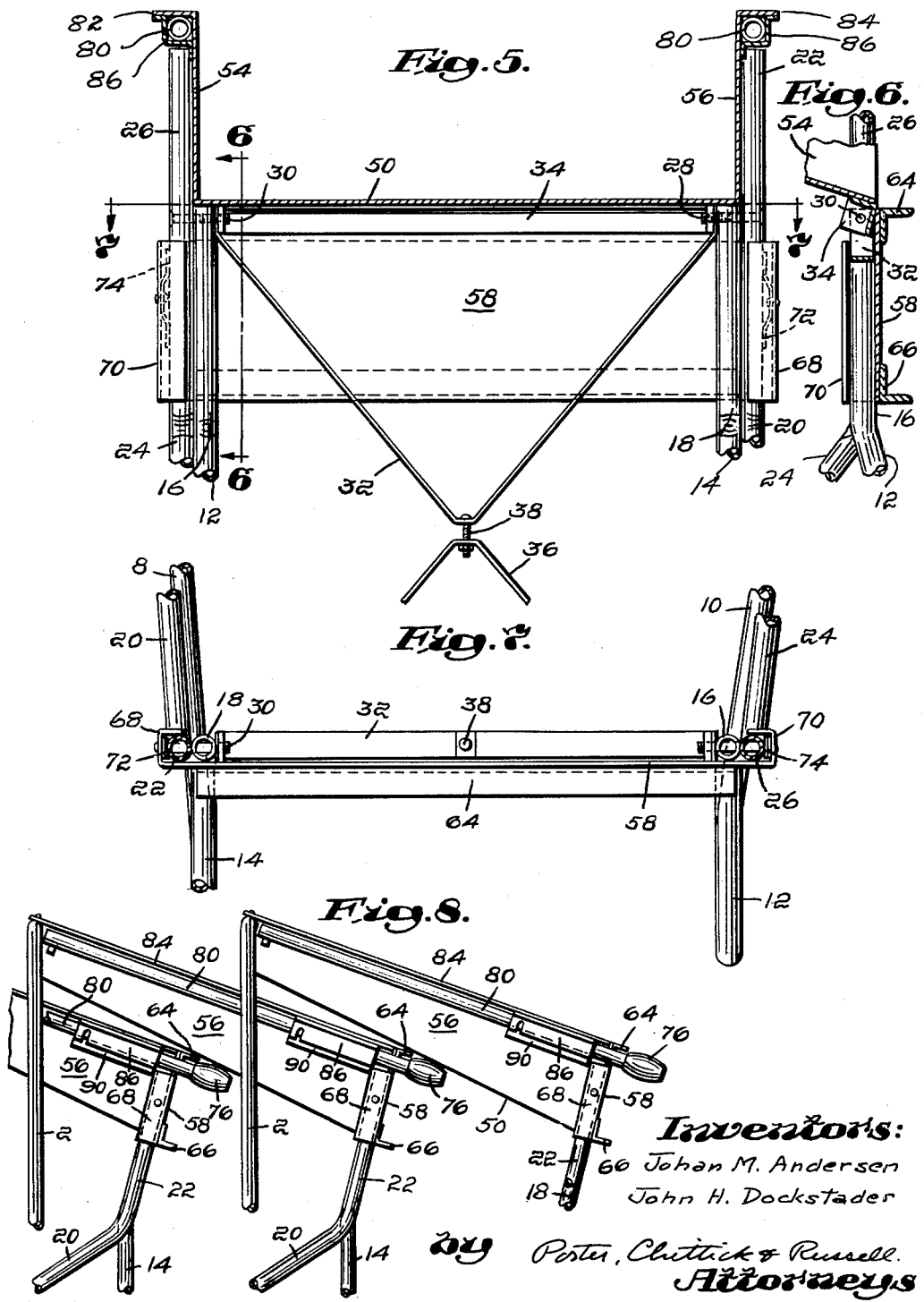

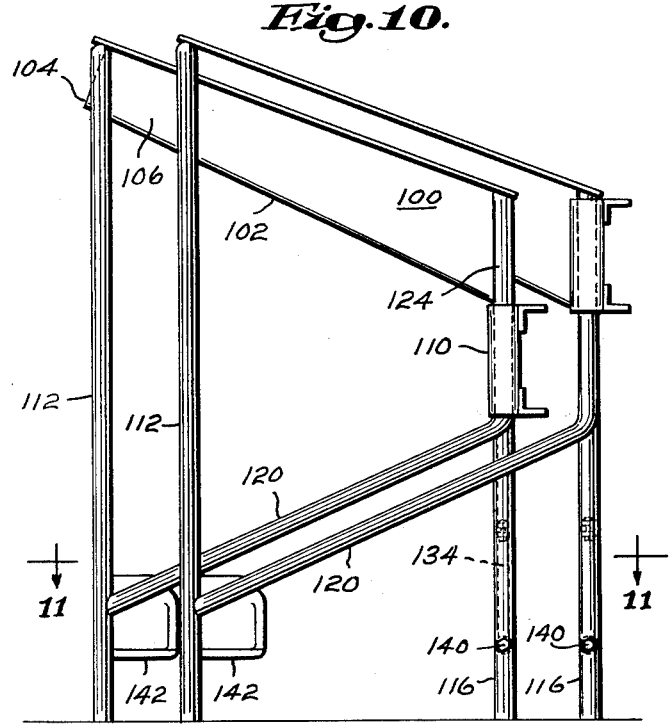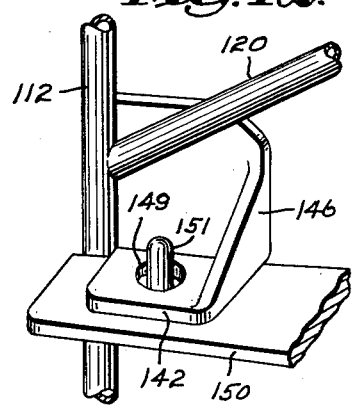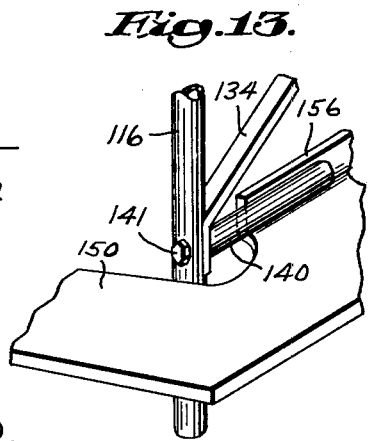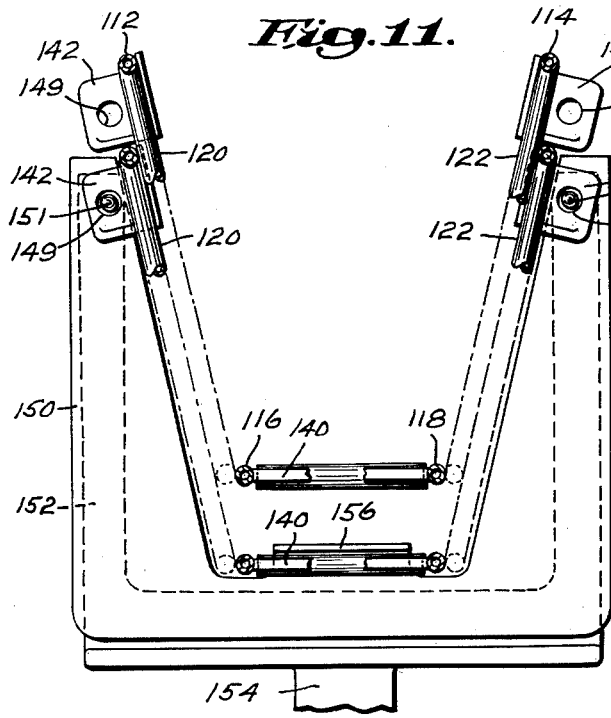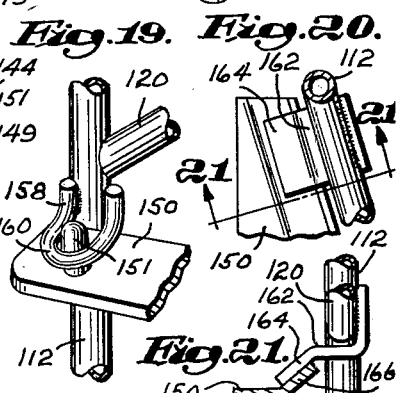
Inventors:
Johan M. Andersen
John H. Dockstader
Porter, Chittick
& Russell
Attorneys

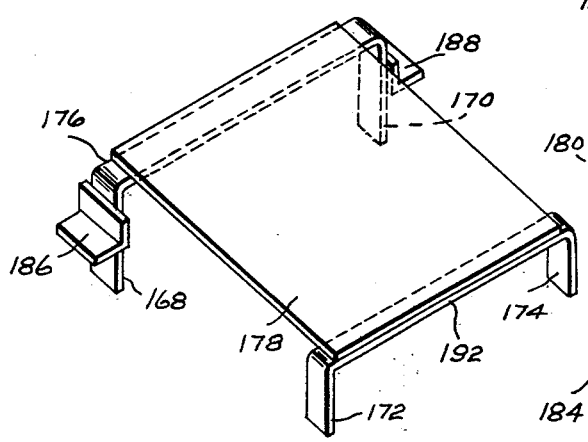
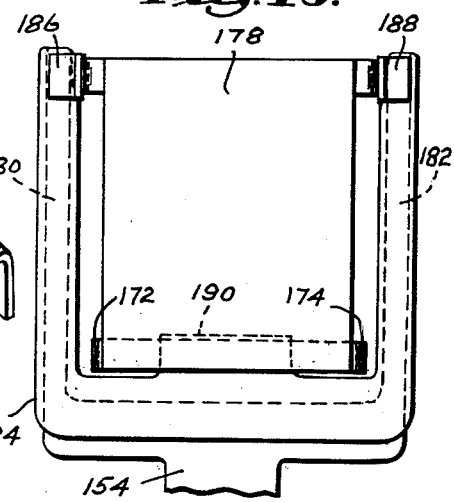
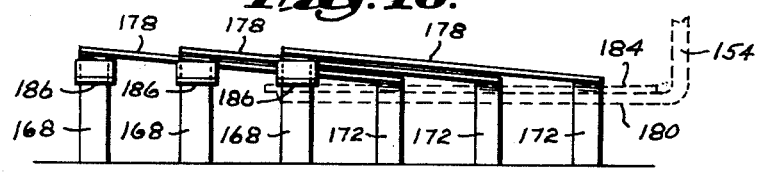
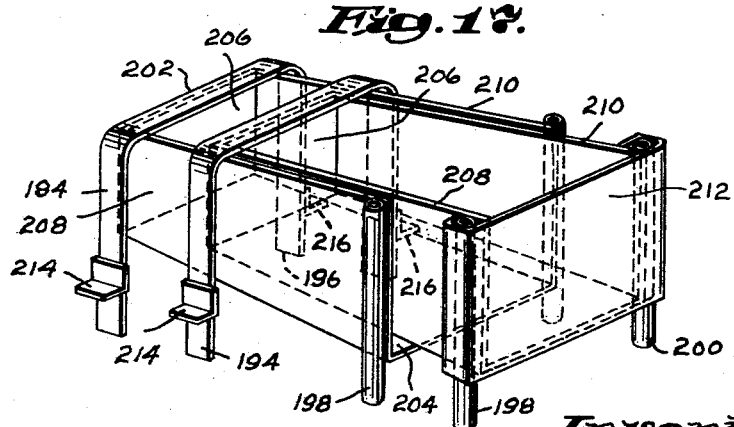

United States Patent Office 3,046,033
Patented July 24, 1962

3,046,033
NESTABLE SHOP TRUCK
Johan M. Andersen and John H. Dockstader, Hopkinton, Mass., assignors to Duplicon Company, Inc., Westboro, Mass., a corporation of Massachusetts
Filed Sept. 25, 1959, Ser. No. 842,527
15 Claims. (Cl. 280—33.99)

This application is a continuation-in-part of the application of Johan M. Andersen et al., Serial No. 779,924, filed December 12, 1958, for Nestable Shop Truck, and now abandoned.

This invention relates to manually movable trucks suitable for use in industrial plants to move parts in process from one machine to another. Generally speaking, the trucks will be used in connection with light manufacturing operations and the load of parts in a truck will be of such weight that the truck can readily be moved either by an operator pushing it on its own wheels or by lifting it by means of a lifting jack, pallet truck, fork truck or the like.

Shop trucks of one kind or another are now in general use in industry, but it has been found that to have an adequate number of trucks available for use when needed, the floor space required will be excessive and hence costly. Thus, in the plant where economy is important, there is likely to be an under supply of trucks which, at times, may slow production.

Accordingly, one of the objects of this invention is to provide a truck so constructed that when empty it may be nested with other similar trucks to an extent capable of positioning as many as five empty trucks in about the space normally occupied by two trucks of the non-nesting type. The construction additionally provides that certain types of trucks, even when fully loaded, may be nested to an extent permitting three trucks to accupy about the space normally required by two conventional trucks.

It is appreciated that the nesting of various devices, including trucks, is in principle old and well understood. Examples are currently seen in the lightly constructed cantilever type trucks commonly found in today's supermarkets, but such trucks cannot be nested when fully loaded.

Thus a further object of the invention is not only to provide nesting trucks but trucks of such strength and rigidity that they may carry loads equivalent to those now carried by conventional non-nesting trucks.

A further object of the invention is to provide nesting shop trucks of inexpensive, simplified construction with handles attached thereto whereby if the truck is a two-wheel truck the front end may be lifted and the truck pushed along on its rear end wheels. In another form, the truck may be mounted on four wheels, one pair being swivel casters, in which case the handles will serve as means for pushing the truck, since lifting would be unnecessary. Another feature of this form of the invention is the provision of handles which when not in use may be pushed to a retracted position out of the way.

A further object is to provide alternative means for moving the trucks of the present construction from one place to another. Instead of having wheels permanently affixed to the trucks, it is proposed to utilize a conventional fork lifting truck or equivalent device which is adapted to engage suitable parts of the truck so that the latter may be readily and safely raised from the floor and then moved by the lifting truck to the new position.

The invention includes not only nestable trays with their usual tapered walls but also nesting elements or pallets which comprise bottom surfaces only from which the walls have been eliminated. In such cases the slope of the bottoms can be made relatively slight so that flat objects placed thereon will not slide off.

When the trucks are to be moved through the use of fork trucks or the like, means has been provided to insure that the truck cannot slip from the lifting fork.

These and other objects of the invention will become more apparent as the description proceeds with the aid of the accompanying drawings in which FIG. 1 is a side elevation of four empty trucks in maximum nested position with the front end gates in down position.

FIG. 2 is an elevational view looking toward the front end of a truck with the front end gate in raised position and with one handle retracted and the other handle extended.

FIG. 3 is a plan view of the truck shown in FIG. 2 with both handles extended.

FIG. 4 is a side elevation of the truck shown in FIG. 3 with the gate in raised position.

FIG. 5 is an enlarged sectional elevation taken on the line 5—5 of FIG. 4.

FIG. 6 is a vertical section taken on the line 6—6 of FIG. 5.

FIG. 7 is a section taken on the line 7—7 of FIG. 5 but turned through an angle of 180 degrees.

FIG. 8 is a fragmentary side elevation showing three trucks with raised gates in minimum nested position as compared with maximum nesting shown in FIG. 1.

FIG. 9 is an enlarged fragmentary perspective taken on the line 9—9 of FIG. 4.

FIG. 10 is a side elevation of two empty nested trucks generally similar to the trucks shown in FIG. 1 but adapted to be lifted and moved by a conventional fork truck.

FIG. 11 is a horizontal section taken on the line 11—11 of FIG. 10 with the fork truck lifting mechanism in position ready to lift and move one of the trucks.

FIG. 12 is a perspective view of the truck lifting pad and the cooperating lifting plate showing means for preventing the pad from sliding off the plate.

FIG. 13 is a perspective view of the front end of the lifting plate showing means for preventing the truck from shifting with respect to the plate.

FIG. 14 shows a modified form of truck using the same principles disclosed in FIG. 10. In this construction the legs have been shortened, the slope of the tray bottom has been reduced and the sides of the tray removed.

FIG. 15 is a plan view of FIG. 14 with the fork lifting truck and lifting plate in position ready to lift the unit shown in FIG. 14.

FIG. 16 is a side elevation showing three of the units of FIG. 14 in nested position. The dotted line indicates the position assumed by the fork lift truck and lifting plate when the first unit is to be lifted and moved.

FIG. 17 shows a truck construction in which the legs have been shortened and the sides of the tray materially deepened. The units are in full nested position with the end wall of the left unit removed.

FIG. 19 shows a modified type of lifting pad and cooperating lifting plate.

FIG. 20 shows another type of lifting pad and cooperating lifting plate.

FIG. 21 is a section taken on the line 21—21 of FIG. 20.

Figure 18:
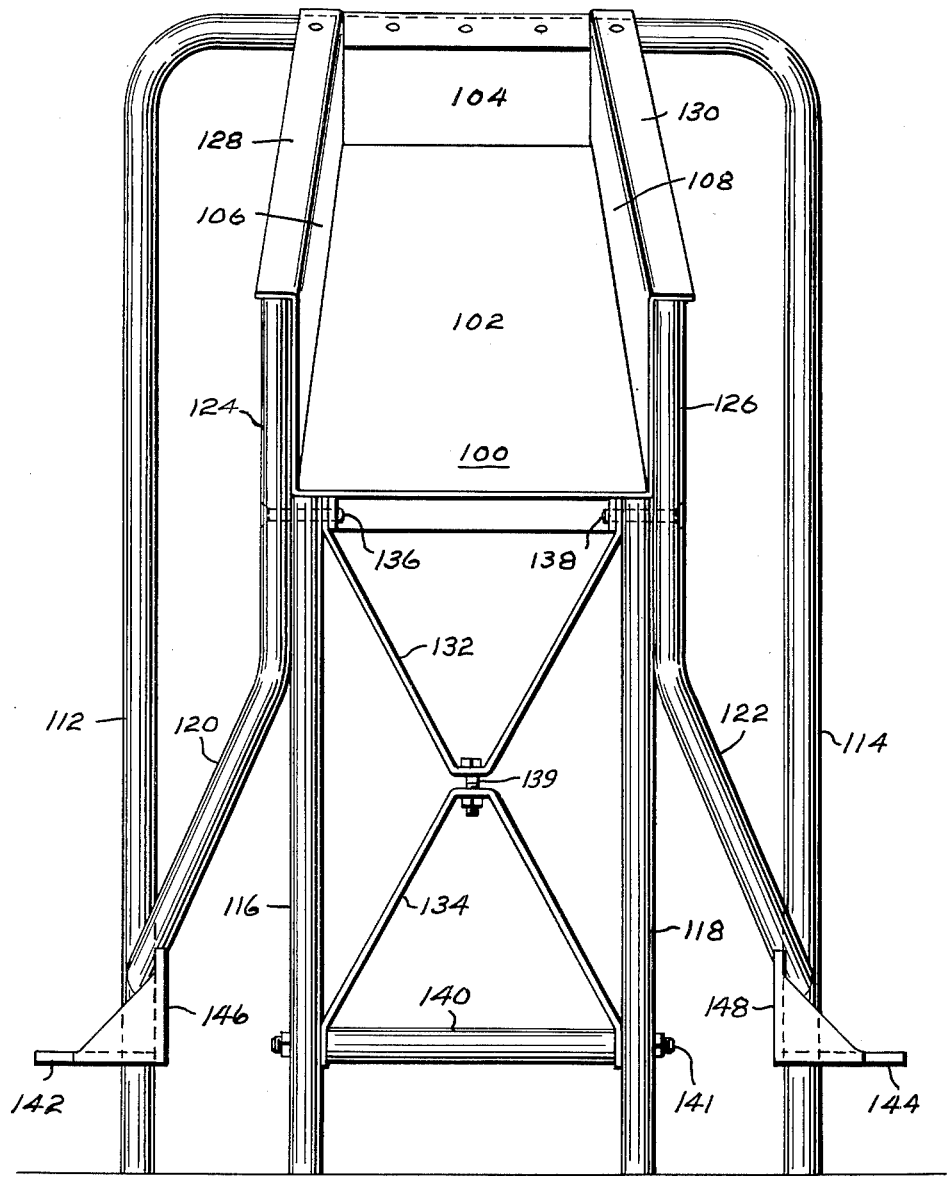
FIG. 18 is an enlarged front end elevation of the unit shown in FIG. 10 with the front wall of the tray removed therefrom.

Referring first to FIGS. 2, 3 and 4 in which is shown an individual truck in front, plan and side views, it will be seen that the truck in one form comprises a pair of generally vertical rear legs 2 and 4 connected at their upper ends by a crossbar 6. The lower ends of the legs are rigidly connected with horizontal frame rails 8 and 10, leg 2 being connected to frame rail 8 and leg 4 to a frame rail 10. The front ends of frame rails 8 and 10 are connected respectively to front legs 14 and 12, the upper ends of which are bent slightly forwardly. Such upper ends are indicated at 16 and 18 in FIGS. 5 and 7.

Also extending from the junction of the rear legs and frame rails are frames extending diagonally upward toward the front. Frame 20 connects leg 2 and frame rail 8 with front leg 14, with the upper portion of frame 20 being bent upwardly as at 22 to extend in parallelism with and upwardly beyond the upper end 18 of leg 14, as can be seen in FIG. 5. Similarly, frame 24 runs from the junction of rear leg 4 and frame rail 10 to meet in parallelism with front leg 12 at its upper portion 16. The parallel upper portions 18 and 22 are connected by a bolt 28 and parallel upper portions 16 and 26 are connected by bolt 30.

Also secured by the bolts 28 and 30 are the ends of an upper brace 32 and the bent turned in ends of a tray bracket 34. A lower brace 36 connected to upper brace 32 by an adjustable tensioning bolt 38 has its lower ends connected to the frame rails 8 and 10 by appropriate bolts, one of which is indicated at 40 in FIG. 4. Also extending horizontally between frame rails 8 and 10 and connected thereto by bolt 40 is a front tie bar 42. Preferably the lower ends of lower brace 36 will be secured between the ends of tie bar 42 and the frame rails 8 and 10, but it will be understood that suitable connection could be made elsewhere in the same vicinity.

The rear legs 2 and 4 and the associated parts are carried by wheels 44 and 46. In the preferred form, legs 12 and 14 at the front end of the truck rest directly on the floor necessitating lifting of the front end of the truck before moving it on wheels 44 and 46. However, wheels may be attached to legs 12 and 14 in the form of casters, as indicated in dotted line in FIG. 4 and numbered 48. In such construction, the truck is merely pushed on its four wheels, eliminating the necessity of lifting the front end.

Mounted on the framework that has just been described is a tray having a bottom 50 which has a rear wall 52, side walls 54 and 56, and a front wall or gate 58. The upper edges of the walls 52, 54 and 56 are flanged outwardly to add rigidity to the tray structure. Flange 60 of rear wall 52 is rigidly affixed to crossbar 6 by a plurality of rivets or bolts 62 or by spot welding if preferred. The side walls are not parallel but instead are closer at the rear than at the front. If the side walls were eliminated as might be possible in handling certain kinds of materials, then the bottom 50 would not have to be tapered. A non-tapered bottom is shown in FIG. 14.

As can be seen in FIGS. 2 and 4, the tray bottom 50 slopes downwardly from rear to front and the front end of the tray rests directly on the tray bracket 34, as shown in FIGS. 5 and 6. The front end of the tray is closed by a movable wall or gate 58, the details of which are best seen in FIGS. 5, 6 and 7. For rigidity, the gate has an angle iron 64 extending crosswise at its upper edge and similarly at its lower edge is an angle iron 66. The side edge portions of gate 58 are bent in U-shaped fashion, as shown at 68 and 70, so as to partially surround the upper ends 22 and 26 of frames 20 and 24.

The gate 58 as viewed in FIGS. 5 and 6 is in down position, and it will be seen that by virtue of the U-shaped end portions 68 and 70 the gate will be maintained in position on the frame ends 22 and 26 in a manner which permits it to be moved upwardly from the open or down position of FIG. 5 to the raised position of FIG. 4 thereby closing the front end of the tray. In order that the gate may be held at any desired position between fully closed and fully open, springs 72 and 74 are interposed between U-shaped portions 68 and 70 and frame ends 22 and 26 respectively. These springs provide sufficient frictional resistance to hold the gate in any desired vertical position.

It will be noted in FIGS. 2 and 3 that the rear legs 2 and 4 are relatively widely spaced and the rear end of the tray is high enough so that the rear end elements may pass over and straddle the front end of another similar truck. That is to say, the gate 58 and all the front supporting structure of one truck in the form of legs 12 and 14 will pass within the confines of legs 2 and 4 of the next truck and under the rear portion of the next tray 50 to be received within the space included between frame rails 8 and 10 and frames 20 and 24.

When the gates 58 are in down position, maximum nesting of a plurality of units is obtained, all as illustrated in FIG. 1. In such arrangement the trucks may move together until the wheels 44 engage. In this nested position, the bottoms 50 of the trays overlap but do not touch due to the selected slope. Similarly, the sides 54 and 56, due to the tapering tray formation, will come into close approximation. The taper preferably is only enough so that the sides of the nested trays will not engage prior to the engagement of the wheels 44.

When the trucks are nested as in FIG. 1 with gates 58 in down position, the trucks will be empty. When the trucks are loaded, the gates 58 will be in fully or partially up position. Under such conditions nesting is still possible but to a more limited extent, as illustrated in FIG. 8. It will also be apparent that if, for example, the gates 58 were dropped halfway, as might be done when the trucks are only partially loaded, increased nesting could be achieved.

In order to facilitate movement of each truck, a pair of retractable handles 76 and 78 have been provided. In a preferred form, the handles may be in the form of rods or pipes 80, slidably maintained under the flanges 82 and 84 of the side walls 54 and 56 by a Z-shaped member 86 which may be spot welded or otherwise conveniently secured thereto. The handle 80 is of such length that when fully retracted it will appear substantially as shown in FIGS. 1 and 8 and, when extended, as in FIGS. 3 and 4. Thus adequate lifting leverage is available. Any convenient means for latching the handles in extended position may be utilized. In the form shown, a pin 88 located near the rear end of handle 80 may be moved inwardly through a slot 90 in the bottom entering edge of Z element 86, after which it may be turned to follow the slot to the position suggested in FIG. 9, at which point the handle will be locked in extended position.

The retractable handles may, of course, take other forms and instead of being slidable with respect to the tray 50 might be slidably mounted on the upwardly sloping frames 20 and 24.

It will be apparent after consideration of the foregoing explanation of the invention that by varying the diameter of the rear wheels, the taper and slope of the tray and the location of the front tie bar 42 the extent of the nesting of the empty trucks with the gates down may be varied to some degree.

In the form disclosed, the rear legs 2 and 4, crossbar 6, frames 20 and 24 and their front upper ends 22 and 26 have been made of a continuous piece of bendable tubing for simplicity of construction and low manufacturing cost. It is obvious, however, that the various elements could be made of individual pieces or of other types of structural members, as, for example, angle irons, channels and other forms that may suggest themselves. The several members can be secured by bolting, riveting, spot welding or otherwise, as may be expedient.

A modification of the present invention is shown in FIGS. 10 to 18. There are instances in the use of nesting shop trucks where very heavy objects are to be transported, so heavy in fact that it has been found impractical to push the trucks about on their own wheels. Instead it has been found better to raise the truck bodily through the use of a conventional fork truck which may be manually or mechanically operated to lift the loaded unit from the floor and move it to its new position.

The units disclosed in FIGS. 10 to 18 are of stronger construction and include special means adapted to cooperate with a fork lift truck. Due to the weights involved, it is important that means be provided for preventing the loaded truck from slipping from the forks of the lift truck. These features will become more apparent when considered with the following description.

As shown in FIGS. 10, 11 and 18, the tray 100, having a bottom 102, rear wall 104, side walls 106 and 108 and front wall or gate 110 (not shown in FIG. 18 from which it has been removed), is supported at the rear by a pair of rear legs 112 and 114 and at the front by a pair of legs 116 and 118. Bracing of the legs is effected by a pair of frame elements 120 and 122 which are welded to the rear legs and slope upwardly to meet the upper parts of the front legs, at which point the frames are turned vertically to parallel the front legs as at 124 and 126. The upper ends of the parts 124 and 126 support the tray sides 106 and 108 and terminate beneath the flanges 128 and 130.

Front legs 116 and 118 are additionally braced by the pair of V-shaped braces 132 and 134. Brace 132 is secured to the legs by bolts 136 and 138 and brace 134 is secured to the legs by the front tie bar 140 in cooperation with the connecting bolt 141. The two braces 132 and 134 are drawn together by bolt 139.

A pair of lifting pads 142 and 144, having suitable supporting structure 146 and 148, are welded to the rear legs and diagonal frames. In a preferred form, each of the pads will have a vertical opening 149 therethrough as shown in FIGS. 11 and 12 whereby a pin 151 extending upwardly from lifting plate 150 may pass therethrough.

As is clearly shown in FIG. 11, lifting plate 150 rests on the fork 152 of the lift truck 154. The lifting plate may be cut on its interior to the general configuration and spacing of the legs of the tray, and the plate may have an upturned lip 156 which, as shown in FIGS. 11 and 13, goes behind the tie bar 140 thereby to further secure the truck from dislodgement from the lifting plate. The lifting force of the lifting plate is brought to bear on the pads 142 and 144 and the under side of tie bar 140.

FIG. 19 shows a modified form of lifting pad which comprises a steel bar 158 with its ends welded to rear leg 112 and turned outwardly as at 160 to form a horizontal eye adapted to receive a pin 151 of lifting plate 150.

Another type of construction adapted to maintain engagement between lifting pad and lifting plate is shown in FIGS. 20 and 21. Here the lifting pad 162 is turned downwardly at an angle as at 164 so that it may be engaged on its under side by a correspondingly upwardly turned diagonal portion 166 of lifting pad 150. This arrangement will also securely hold the lifting pads in position on the ends of lifting plate 150.

Another modification of the invention is shown in FIGS. 14, 15 and 16. Where sheet material is to be conveyed by the trucks, it has been determined that the sides of the trays may be eliminated if the slope of the bottom of the tray may be reduced in pitch sufficiently so that the articles will not slide off.

The same principles used in the constructions of FIGS. 1 and 10 are utilized herein in that the rear legs 168 and 170 are spaced far enough apart so as to pass over the more closely positioned front legs 172 and 174. Likewise the height of legs 168 and 170 is such as to permit the crosswise support 176 to pass over the upper front edge of the supporting surface 178. The nesting of the units shown in FIG. 14 is illustrated in FIG. 16. This type of unit may be lifted and moved in the same manner as the construction of FIGS. 10 and 11. The truck 154 has spaced fork elements 180 and 182 on which rests lifting plate 184. The pads 186 and 188 rest on the ends of lifting plate 184 and the central extension 190 of the lifting plate engages the under side of the front cross support 192.

A further modification is disclosed in FIG. 17. This construction contemplates a tray arrangement of considerable depth and strength adapted to carry objects which could not readily be transported by the construction of FIG. 14. Here the rear legs 194 and 196 are spaced laterally sufficiently to pass over front legs 198 and 200. The rear crossbar 202 is likewise high enough to pass over the upper ends of front legs 198 and 202 and the top edges of the walls of the tray. Thus the trays may be nested in the same manner as contemplated by the constructions of FIGS. 1 and 10. In FIG. 17 each tray has a bottom 204, a rear wall 206, side walls 208 and 210 and a front wall 212. The front wall 212 is removable by sliding it upwardly off legs 198 and 200 so that the units may be nested in the intended manner. The rear legs have affixed thereto the lifting pads 214 and 216 similar to those already described, which lifting pads are adapted to cooperate with the ends of a lifting plate such as lifting plate 184 shown in FIG. 15. Projection 190 of the lifting plate will be positioned to engage the front under side of the tray bottom 204.

From the foregoing description, it is apparent that a nestable shop truck has been devised in which the tray of each truck is capable of carrying the required load. The frame is rigidly braced, and the supporting legs are sufficiently widely spread so that the chance of upsetting is practically eliminated. The front end of the tray is established at a proper height for easy removal of the parts therein by the machine operator according to the work to be performed, and the trucks may be moved either on their own wheels or through the use of a lift truck.

It is our intention to cover all changes and modifications of the example of the invention herein chosen for purposes of the disclosure which do not constitute departures from the spirit and scope of the invention.

We claim:

1. A nestable shop truck comprising a tray having a bottom sloping upwardly toward the rear of said truck and decreasing in width from the front to the rear, said tray including a rear wall, tapering side walls and a removable front wall constituting a gate, a pair of legs, means connecting the upper ends of said legs and supporting the rear end of said tray, said legs spaced laterally a distance greater than the width of the front end of said tray, and supports affixed to the front end of said tray of less vertical dimension and less lateral spacing than the said legs, whereby said tray may be maintained in a sloping position by said rear legs and said supports.

2. A nestable shop truck as set forth in claim 1, and wheels supporting said rear legs and handles associated with the front end of said truck to facilitate manual movement of said truck.

3. A nestable shop truck as set forth in claim 1 in which said gate is movable up and down with respect to said tray bottom whereby when said gate is in down position another similar truck may be moved into closely nested position therewith.

4. A nestable shop truck comprising a pair of vertically disposed rear legs, a crossbar connecting the upper ends of said rear legs, a pair of vertically disposed front legs closer together than said rear legs, a pair of diagonally disposed braces each extending from one of said rear legs upwardly to one of said front legs, means including a tie bar connecting said front legs near their lower ends, a tray bracket connecting the upper ends of said front legs, and a tray having a bottom, rear wall, tapered side walls and a removable front wall, said tray sloping downwardly from the rear to the front and supported at the rear by said crossbar and at the front by said tray bracket.

5. A nestable shop truck as set forth in claim 4, a pair of wheels supporting said rear legs, and handles on the front end of said truck whereby said truck may be manually moved on said wheels.

6. A nestable shop truck as set forth in claim 4, and laterally extending pads on said rear legs at substantially the same level as the said tie bar, whereby a lifting plate may be placed under said pads and tie bar to lift said truck.

7. A nestable shop truck as set forth in claim 4 and including side walls which taper from the front legs toward the rear legs in which the slope of said tray is such that when said front wall has been removed from its position in which it normally closes the front end of said tray, another truck may be closely nested with the extent of the nesting being limited only by engagement of parts of the truck structure.

8. A nestable shop truck as set forth in claim 4, and transverse diagonal bracing means between the said front legs.

9. A nestable shop truck as set forth in claim 4 in which said rear legs, crossbar and diagonally disposed braces constitute a continuous element in the form of an appropriately bent tube, the terminal ends of said braces being turned generally vertically and acting as guide rails for directing the movement of said removable front wall.

10. A nestable shop truck as set forth in claim 5, said handles being movable from a retracted to extended position whereby when extended greater lifting leverage may be obtained.

11. A nestable shop truck comprising a pair of widely spaced legs, a pair of less widely spaced legs, means connecting said widely spaced legs, a tray supported at its ends by said legs, said tray having a sloping bottom, oppositely disposed end walls and tapering side walls, one end wall being narrower than the other end wall and located at the higher end of said tray, said higher end being supported by said means connecting said widely spaced legs, said widely spaced legs being apart a distance greater than the width of said other end wall, said other end wall being affixed to said less widely spaced legs, a substantial part of said sloping tray being higher than the upper edge of said other end wall, whereby two of said trucks may be brought to nested position with said trays overlapping in part and the widely spaced legs of one truck straddling the tray of the other truck.

12. A nestable shop truck as set forth in claim 11, said other end wall being movable to lower the upper edge of said other end wall thereby to permit two trucks to be moved to closer nested position.

13. A nestable shop truck comprising a pair of rear legs which are widely spaced, means connecting the upper ends of said rear legs, a pair of front legs which are less widely spaced and whose vertical dimensions are less than the height of said connecting means, a tray with converging longitudinal boundaries having its narrower end at said widely spaced rear legs and comprising a bottom which is secured to and slopes upwardly from said front legs to said rear legs, and further including a rear wall, a removable front wall and tapering side walls, the height of the underside of said bottom intermediate said rear and front legs being higher than the upper side of said bottom at said front legs and all parts of said connecting means at the position of said rear legs also being higher than the said front wall, whereby two of said trucks may be caused to nest.

14. A nestable shop truck comprising a pair of rear legs which are widely spaced, means connecting the upper ends of said rear legs, a pair of front legs which are less widely spaced and whose vertical dimensions are less than the height of said connecting means, a tray comprising a bottom which is secured to and slopes upwardly from said front legs to said rear legs, the height of the underside of said bottom intermediate said rear and front legs being higher than the upper side of said bottom at said front legs, whereby two of said trucks may be caused to nest, and a pair of lift pads extending outwardly from said rear legs, the under surface of said pads being substantially at the same height as the under surface of said bottom between said front legs for engagement, respectively, with the ends and central extension of a lifting plate carried by the forks of a fork lift truck.

15. A nestable pallet comprising a flat, generally rectangular load supporting plate, a pair of ground engaging front legs extending downwardly from two adjacent corners of said plate, a pair of ground engaging rear legs extending downwardly from the remaining two corners of said plate, said rear legs being spaced to have an inside clearance therebetween wider than the width including the outside dimensions of said front legs, the length of said rear legs being greater than the length of said front legs by an amount sufficient to provide sliding clearance between adjacent plates of nested pallets up to a substantial amount of overlap, and a pair of lift pads extending outwardly from said rear legs, the under surface of said pads being substantially at the same height as the under surface of said plate between said front legs for engagement, respectively, with the ends and central extension of a lifting plate carried by the forks of a fork lift truck.

References Cited in the file of this patent

UNITED STATES PATENTS

| | | |
|---|---|---|
| 562,139 | McCabe | June 16, 1896 |
| 1,828,248 | Hallowell et al. | Oct. 20, 1931 |
| 2,556,532 | Goldman | June 12, 1951 |
| 2,639,161 | Goldman | May 19, 1953 |
| 2,700,582 | Munsch | Jan. 25, 1955 |
| 2,727,750 | Noll | Dec. 20, 1955 |
| 2,738,201 | Spears | Mar. 13, 1956 |
| 2,762,669 | Watson | Sept. 11, 1956 |
| 2,764,419 | Enders | Sept. 25, 1956 |
| 2,809,796 | Averill | Oct. 15, 1957 |
| 2,818,267 | Watson | Dec. 31, 1957 |